US012607517B2

(12) United States Patent
Flössholzer

(10) Patent No.: US 12,607,517 B2
(45) Date of Patent: Apr. 21, 2026

(54) TEMPERATURE SENSING PROBE AND SYSTEM

(71) Applicant: VERSUNI HOLDING B.V., Eindhoven (NL)

(72) Inventor: Hannes Uwe Flössholzer, Eindhoven (NL)

(73) Assignee: VERSUNI HOLDING B.V., Eindhoven (NL)

( * ) Notice: Subject to any disclaimer, the term of this patent is extended or adjusted under 35 U.S.C. 154(b) by 26 days.

(21) Appl. No.: 18/035,274

(22) PCT Filed: Sep. 27, 2022

(86) PCT No.: PCT/EP2022/076825
§ 371 (c)(1),
(2) Date: May 3, 2023

(87) PCT Pub. No.: WO2023/057263
PCT Pub. Date: Apr. 13, 2023

(65) Prior Publication Data
US 2024/0295441 A1 Sep. 5, 2024

(30) Foreign Application Priority Data

Oct. 5, 2021 (EP) ...................................... 21200837

(51) Int. Cl.
*G01K 7/34* (2006.01)
*G01K 1/024* (2021.01)
(52) U.S. Cl.
CPC .............. *G01K 1/024* (2013.01); *G01K 7/34* (2013.01); *G01K 2207/06* (2013.01)

(58) Field of Classification Search
None
See application file for complete search history.

(56) References Cited

U.S. PATENT DOCUMENTS

| 4,377,733 A | 3/1983 | Yamaguchi et al. |
| 4,475,024 A | 10/1984 | Tateda |
| (Continued) | | |

FOREIGN PATENT DOCUMENTS

| CN | 102846313 A | 1/2013 |
| CN | 111366262 A | 7/2020 |
| (Continued) | | |

OTHER PUBLICATIONS

Extended European Search Report issued in connection with corresponding EP Application No. 21200837.9 dated Mar. 24, 2022.

*Primary Examiner* — Erica S Lin
(74) *Attorney, Agent, or Firm* — Maschoff Brennan

(57) ABSTRACT

A wireless temperature monitor probe includes a spike for insertion into an object for which a core temperature is to be monitored and a head at a proximal end of the spike. A sensor inductor coil is in the head and is used for wireless interrogation by an external detector unit to determine the core temperature. The spike axis is not in the plane of the inductor coil in the head, for example so that there is a bend between them. This makes it easier to insert the spike while maintaining a desired orientation of the head, in particular to enable correct communication with the remote detector unit. In addition, it enables the head to be positioned against the object so that the probe takes up a minimum amount of space.

18 Claims, 5 Drawing Sheets

(56) References Cited

U.S. PATENT DOCUMENTS

| | | | |
|---|---|---|---|
| 7,052,471 B2 | 5/2006 | Lussier et al. | |
| 8,398,303 B2 | 3/2013 | Kuhn | |
| 10,416,027 B2 | 9/2019 | Brown et al. | |
| 10,724,904 B2 | 7/2020 | Herzog et al. | |
| 2008/0259995 A1* | 10/2008 | Kuhn | G01K 7/32 |
| | | | 374/E1.004 |
| 2009/0138241 A1* | 5/2009 | Parachini | G01K 1/026 |
| | | | 702/188 |
| 2014/0341254 A1* | 11/2014 | Mendez | G01K 1/026 |
| | | | 374/137 |
| 2019/0041271 A1* | 2/2019 | Preston | G01K 1/026 |
| 2021/0010872 A1 | 1/2021 | Song et al. | |
| 2021/0048347 A1 | 2/2021 | Sitaraman et al. | |

FOREIGN PATENT DOCUMENTS

| | | | | |
|---|---|---|---|---|
| DE | 3836099 A1 * | 5/1990 | | H05B 3/68 |
| EP | 0192754 A1 | 9/1986 | | |
| EP | 2015040 A2 | 1/2009 | | |
| JP | 2001-083018 A | 3/2001 | | |
| WO | 2021058390 A1 | 4/2021 | | |

* cited by examiner

TEMPERATURE SENSING PROBE AND SYSTEM

CROSS-REFERENCE TO RELATED APPLICATIONS

The present application is a U.S. National Phase application under 35 U.S.C. § 371 of International Application No. PCT/EP2022/076825, filed on Sep. 27, 2022, which claims the benefit of European Patent Application No. 21200837.9, filed on Oct. 5, 2021. This application is hereby incorporated by reference herein.

FIELD OF THE INVENTION

This invention relates to a temperature sensing probe and system, for example for sensing a food core temperature during cooking.

BACKGROUND OF THE INVENTION

Many cooking and baking devices make use of interactive recipes in order to ensure optimized taste and healthiness of the cooked meals.

For these devices it is often important to measure the core temperature of the food item. As an example, it is well known to monitor the temperature of a beef steak during cooking in order to achieve a desired doneness, such as medium, medium-rare, etc. Similarly, it is also helpful to measure accurately the doneness of other types of food items, e.g. vegetables.

There are a number of drawbacks associated with the currently available temperature sensing techniques. For example, some temperature sensors require the use of intrusive cabling which is inconvenient to use and may make it difficult for a user to operate the temperature sensor in a user-friendly and correct manner. As another example, some temperature sensors require the use of batteries which may be troublesome in terms of installation and replacement.

Consumer feedback with respect to wired temperature sensors is mostly negative, and accordingly there is a demand for practical wireless temperature sensing solutions. However, currently available wireless temperature sensing solutions typically involve wireless communication technologies such as Wi-Fi and Bluetooth, and they are usually limited to a small operating temperature range that may be inappropriate or insufficient for cooking applications (e.g. frying, baking, etc.).

Other types of currently available wireless temperature sensors involve techniques based on the use of quartz crystals and/or surface acoustic waves, which significantly increases the costs relating to manufacture and maintenance.

A cost-effective wireless temperature sensor would be greatly preferred by consumers from the point of view of usability, as well as achieving a desired level of taste and healthiness of the resulting cooked food items.

WO 2021/058390 discloses a temperature probe which includes a resonant circuit, the resonant circuit having a temperature-dependent resonant frequency based on a capacitor having a temperature-dependent capacitance. A detector unit is configured to interface with the resonant circuit to receive a response associated with a current resonant frequency of the resonant circuit. This probe avoids the need for a wired connection between the sensing element and the detector unit. Instead, a wireless inductive coupling is formed between the resonant circuit and the detector unit. A control unit determines the current resonant frequency of the resonant circuit based on the received response, and thereby determines the probe temperature.

The detector unit comprises a transmitter-receiver coil and it interfaces with the resonant circuit for example by controlling the transmitter-receiver coil to perform a frequency sweep to excite the resonant circuit in the sensing element.

An issue with the use of an inductive coupling is that the resonant circuit coil needs to be parallel to the detector unit coil to ensure correction functioning of the system. The core temperature probe also needs a part to enter the core of the item being monitored and an external handle part, which may for example include the coil for inductive coupling. Thus, the probe takes up space on a cooking surface or in a cooking chamber.

SUMMARY OF THE INVENTION

The invention is defined by the claims.

According to examples in accordance with an aspect of the invention, there is provided a wireless temperature monitor probe, comprising:

a spike for insertion into an object for which a core temperature is to be monitored, the spike having a temperature monitoring region;

a head at a proximal end of the spike, the head for remaining outside the object; and a circuit having a temperature-dependent characteristic, wherein the circuit includes a sensor inductor coil for wireless interrogation by an external detector unit thereby to determine the temperature at the temperature monitoring region, wherein the sensor inductor coil is located in the head (306), and wherein the spike has an elongate axis which is offset from a plane of the sensor inductor coil.

This temperature monitor probe has a spike for insertion into an object, such as a food item to be cooked, and an external head. The tip of the spike which is inserted into the object may be considered to be the distal end, and the opposite end (where the head is connected) is the proximal end. The spike elongate axis and the head are non-planar so that there is a bend between them. This makes it easier to insert the spike while maintaining a desired orientation of the head, in particular to enable correct communication with the remote detector unit. In addition, it enables the head to be positioned against the object so that the probe takes up a minimum amount of space.

The bend is for example between 90 and 180 degrees, for example between 135 and 180 degrees, for example between 160 and 180 degrees. This forms a U-bend or nearly a U-bend. The spike may then be inserted laterally (horizontally) and the head sits above the spike also in a horizontal plane. This horizontal orientation of the head and/or the spike is for example the desired orientation for interrogation by the detector unit.

Because the sensor inductor coil is in the head, the orientation of the head is important to enable interrogation by the external detector unit. The head can be held by hand with a desired orientation (e.g. horizontal) and the spike can be inserted into the object to maintain that desired orientation. For example, the head may be mounted flat (horizontal) over the top of the object.

A minimum spacing between an end of the spike to be inserted into the object and the head is for example in the range 25 mm to 30 mm. When a U-bend is provided, this spacing for example corresponds to the depth at which the end of the spike is inserted into the object.

A diameter of the spike is for example in the range 2 mm to 6 mm. This gives space for any circuit components to be formed internally of the spike, such as a temperature-dependent component such as a capacitor, while preventing excessive damage to the object by insertion of the spike.

A length of the spike to be inserted in the object is for example the range 25 mm to 60 mm.

The circuit for example comprises one or more components with temperature-dependent characteristics. The components and the sensor inductor coil together form a resonant circuit.

The components with temperature-dependent characteristics for example comprise a capacitor with temperature-dependent capacitance and/or a thermistor with a temperature-dependent resistance and/or an inductor with a temperature-dependent inductance. Thus, passive circuit components with temperature dependency are used to form, with the inductor sensor coil, a temperature-dependent impedance. This temperature-dependent impedance results in a temperature-dependent resonant frequency.

The resonant frequency of this circuit can then be externally measured by the detector unit in order to determine the temperature.

The temperature-dependent components are preferably in the spike, for example near a tip of the spike.

The spike may be pivotably attached to the head. This allows adjustment of the head orientation after insertion of the spike. The spike may comprise a straight section and a bend section pivotably coupled together. This allows additional adjustment of the overall shape of the probe.

The temperature monitor probe is preferably for monitoring the core temperature of a food object during cooking.

The invention also provides a wireless temperature monitoring system comprising:

the temperature monitor probe as defined above; and a detector unit comprising a pick-up coil for inductive coupling to the sensor inductor coil and a detection circuit.

The detector unit provides remote monitoring of the circuit of the temperature monitor probe using inductive coupling. Thus, the probe does not need a power supply. The detector unit may be integrated into a cooking appliance.

The detection circuit for example comprises a frequency sweep circuit and a processor for determining a resonant frequency of the circuit of the temperature probe.

The invention also provides a cooking appliance comprising the wireless temperature monitoring system defined above, the cooking appliance comprising a housing, and wherein the pick-up coil of the detector unit is integrated into a part of the housing.

The pick-up coil of the detector unit may be integrated into a lid of the housing.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
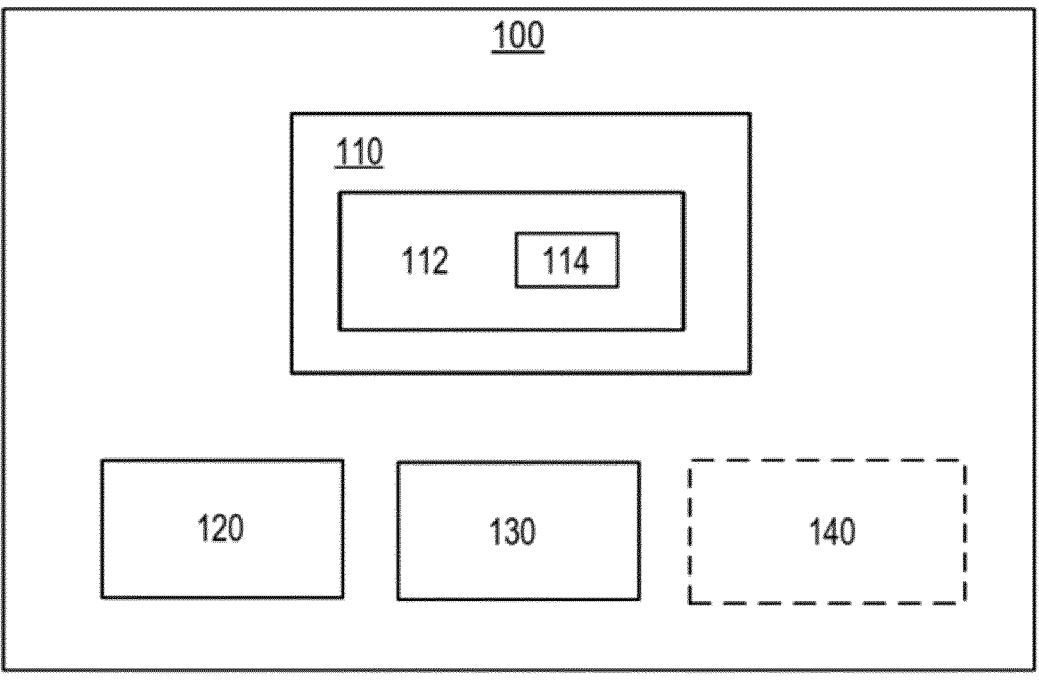
FIG. 1 shows a block diagram of a known wireless temperature monitoring system.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a wireless temperature monitor probe comprising a spike for insertion into an object for which a core temperature is to be monitored and a head at a proximal end of the spike. A sensor inductor coil is in the head and is used for wireless interrogation by an external detector unit to determine the core temperature. A spike elongate axis is not in the plane of the head for example so that there is a bend between them. This enables the head to be mounted against the object saving space, and it facilitates a correct alignment of the head for correct interrogation by the external detector unit.

The invention relates to a wireless temperature probe and in particular using inductive coupling between the probe and a remote detector unit. By way of example, the type of wireless temperature probe as described in WO 2021/058390 will first be described. Further details can be found in WO 2021/058390, but the invention may also be applied to other types of wireless temperature probes, with other choices of temperature-dependent circuit components.

Figure 2:
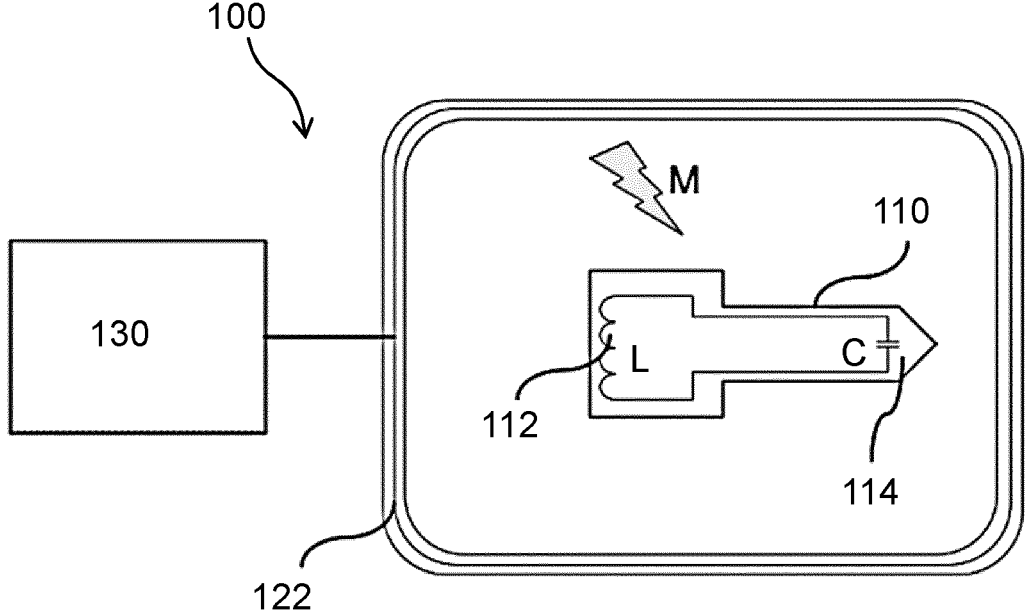
FIG. 2 shows an implementation of the system of FIG. 1.

FIGS. 1 and 2 are taken from WO 2021/058390.

FIG. 1 shows a block diagram of a wireless temperature monitoring system 100 which can be used for sensing the temperature of an object, such as the core temperature of a food item during cooking.

As illustrated in FIG. 1, the system 100 comprises a sensing probe 110 configured to be inserted into the object. For example, the sensing probe 110 may be inserted into a solid food item such as a potato or a piece of meat. The sensing probe 110 comprises a resonant circuit 112 (e.g. a LC circuit), which has a temperature-dependent resonant frequency. In an example, the resonant circuit 112 comprises a capacitor 114 which has a temperature coefficient of its capacitance. However other temperature-dependent components such as thermistors may additionally or alternatively be used. In some embodiments, the temperature coefficients of the components may be present in a predetermined temperature range corresponding to an expected temperature range of the object.

For the example of a temperature-dependent capacitor 114, the capacitor may be a ceramic capacitor, and it may comprise Y5V (dielectric) material. It may be advantageous to use ceramic capacitors comprising Y5V material in the system 100, as these types of capacitors typically possess the beneficial property that enables the resonant circuit 112 to alter in its properties depending on the surrounding temperature. Such alteration in properties allow the temperature of the object to be determined.

In more detail, in multi-layer ceramic capacitors (MLCC) the insulating material between the electrodes (also known as dielectric material) has a high impact on the resulting capacitance of the capacitor. The properties of the dielectric material vary with temperature. This is typically an unwanted parasitic effect in an electronic circuit, but in this case this particular effect allows the temperature of the capacitor to be estimated or determined.

Furthermore, when the sensing probe 110 is inserted into an object, the capacitor 114 may be protected from overheating by the object. For example, the capacitor 114 may be protected from overheating once the sensing probe 110 is inserted into a food item that is placed inside a baking oven.

Although not shown in FIG. 1, in some examples the system 100 may comprise one or more additional sensing probes. In such cases the sensing probe 110 may be referred to as the "first sensing probe", and the one or more additional sensing probes may be referred to, collectively, as "additional sensing probe(s)". In these embodiments, each of the one or more additional sensing probes may comprise a respective resonant circuit, and each of the one or more additional sensing probes may be inserted into or placed adjacent to the object.

Each of the respective resonant circuits of the one or more additional sensing probes may have a different temperature-dependent resonant frequency from each other. In addition, the temperature-dependent resonant frequency of each of the resonant circuits may be different from the temperature-dependent resonant frequency of the resonant circuit of the first sensing probe 110.

The system 100 further comprises a detector unit 120. The detector unit 120 is configured to interface with the resonant circuit 112 to receive a response associated with a current resonant frequency of the resonant circuit 112.

The detector unit 120 in particular comprises a transmitter-receiver coil. The interface between the sensing probe 110 and the detector unit 120 comprises a magnetic coupling between the detector unit 120 and the resonant circuit 112. In more detail, a magnetic coupling may be induced between the transmitter-receiver coil of the detector unit 120 and the resonant circuit 112 when the sensing probe 110 is placed within the vicinity of the detector unit 120.

Furthermore, the detector unit 120 may be configured to interface with the resonant circuit 112 by controlling the transmitter-receiver coil to perform a frequency sweep to excite the resonant circuit 112 in the sensing probe 110. This control is implemented by a control unit 130 which functions as a detection circuit. The frequency sweep may be a stepped sweep including a plurality of discrete steps each associated with a different frequency band. The detector unit 120 may be configured to perform each step in the frequency sweep by transmitting a corresponding radio-frequency stimulating signal to the resonant circuit 112 of the sensing probe 110, and the resonant circuit 112 may be configured to transmit a response signal for each step in the sweep as a result of the excitation.

A corresponding radio-frequency stimulating signal may be within the frequency range of 10 kHz to 1 MHz. Other frequency band ranges and values would be possible depending on the type of circuit used as the resonant circuit 112.

As indicated above, in some examples the system 100 may comprise one or more additional sensing probes each comprising a respective resonant circuit. In these embodiments, the detector unit 120 may be configured to interface with each of the resonant circuits of the additional sensing probe(s) and of the first sensing probe 110, in order to receive a response associated with a current resonant frequency of the respective resonant circuit. Therefore, in these embodiments, for each of the resonant circuits associated with first sensing probe and the additional sensing probe(s), a respective response may be received.

Although the sensing probe 110 and the detector unit 120 are both part of the system 100, the sensing probe 110 and the detector unit 120 are physically unconnected. Thus, the temperature monitor probe is wireless. It also does not need a power source and is thus a passive circuit, but which can be interrogated remotely by the inductive coupling mentioned above.

The sensing probe 110 and the control unit 130 may also be physically unconnected. Therefore, during an operation of the system 100, the sensing probe 110 can be inserted into the object in a wireless manner, which in turn improves the usability and flexibility of the system 100 as a whole. In addition, since the sensing probe 110 may be physically detached from the rest of the components of the system 100, the sensing probe 110 can be maintained, replaced, and cleaned easily.

The control unit 130 is configured to determine the current resonant frequency of the resonant circuit 112 based on the received response. The control unit 130 is also configured to determine the temperature of the object based on the determined current resonant frequency of the resonant circuit. Within an appropriate temperature range, the capacitor is selected such that there is a strong correlation between temperature and a resonant frequency of the resonant circuit 112. The determination of the temperature of the object is thus based on this correlation. Moreover, since a change in the temperature surrounding the capacitor 114 of the resonant circuit 112 would result in shifting of the resonant frequency of the resonant circuit 112, the shift of resonant frequency is indicative of a change in the temperature surrounding the capacitor 114.

Based on preliminary test measurements, depending on the material used in the capacitor 114, and/or the type of capacitor 114 used in the resonant circuit 112, the system 100 may have an operating temperature range from 10° C. to 100° C. In some examples, the sensing probe 110 may be configured such that when the temperature at the capacitor 114 exceeds a predetermined value (e.g. 120° C.), a shutoff mechanism is effected so as to prevent damage to the sensing probe 110 and/or the rest of the components in the system 100.

As indicated above, the resonant circuit 112 may be configured to transmit a response for each step in a stepped sweep. For this purpose, the control unit 130 determines the current resonant frequency of the resonant circuit 112 by processing the response signals from the resonant circuit 112. Specifically, the control unit 130 may determine the current resonant frequency of the resonant circuit 112 based on the corresponding strengths and/or measured frequency values of the frequency-dependent response signals from the resonant circuit 112.

When multiple sensing probes are used, the control unit 130 may be configured to determine the temperature of different parts of the object, based on the determined current resonant frequency of the resonant circuit of the respective multiple sensing probes. The part of the object corresponding to a respective additional sensing probe may be a partial volume immediately adjacent to a location at which the respective additional sensing probe is placed.

The control unit 130 generally controls the operation of the system 100. The control unit 130 can comprise one or more processors, processing units, multi-core processor or modules that are configured or programmed to control the system 100. In particular implementations, the control unit 130 can comprise a plurality of software and/or hardware modules that are each configured to perform, or are for performing, individual or multiple steps of the method described herein.

The system 100 may further comprise a display unit 140 configured to display the determined temperature of the object.

FIG. 2 shows an implementation of the system of FIG. 1. The system 100 comprises the sensing probe 110, the detector unit, and the control unit 130. The detector unit includes a pick-up coil 122.

The sensing probe 110 is physically unconnected with the detector unit and the control unit 130. The sensing probe 110 has a spike 114 at one end of the sensing probe 110 to allow the sensing probe 110 to inserted into an object, e.g. a food item such as a piece of meat or a potato.

The resonant circuit 112 is shown as an inductor L, which is a sensor inductor coil for wireless interrogation by the external detector unit, and the temperature-dependent capacitor C. The LC circuit 112 thus has a temperature-dependent resonant frequency. The resonant circuit 112 is for example encapsulated inside the sensing probe. The capacitor C has a temperature coefficient in a predetermined range.

The pick-up coil 122 of the detector unit is for inductive coupling to the sensor inductor coil L and the detection circuit 130 for analyzing a response from the resonant circuit 112. The detector unit thus interfaces with the resonant circuit 112 to receive a response associated with a current resonant frequency of the resonant circuit 112. The magnetic coupling M between the detector unit 120 and the resonant circuit 112 resulting from the interface operation between these two components is represented by a lightning icon in FIG. 2. The resonant circuit 112 of the sensing probe 110 is placed inside the magnetic field generated by the transmitter-receiver coil of the detector unit 120, therefore resulting in the magnetic coupling M between these components.

To the extent describe above, the system is known, with a capacitor used as the temperature-dependent component. This invention relates in particular to the sensor probe design.

To achieve a desired inductive coupling between the sensor inductor coil L and the pick-up coil 122 of the detector unit, the two coils should preferably lie in parallel planes. Furthermore, the sensor inductor coil L should not be too close to adjacent metal parts.

Figure 3:
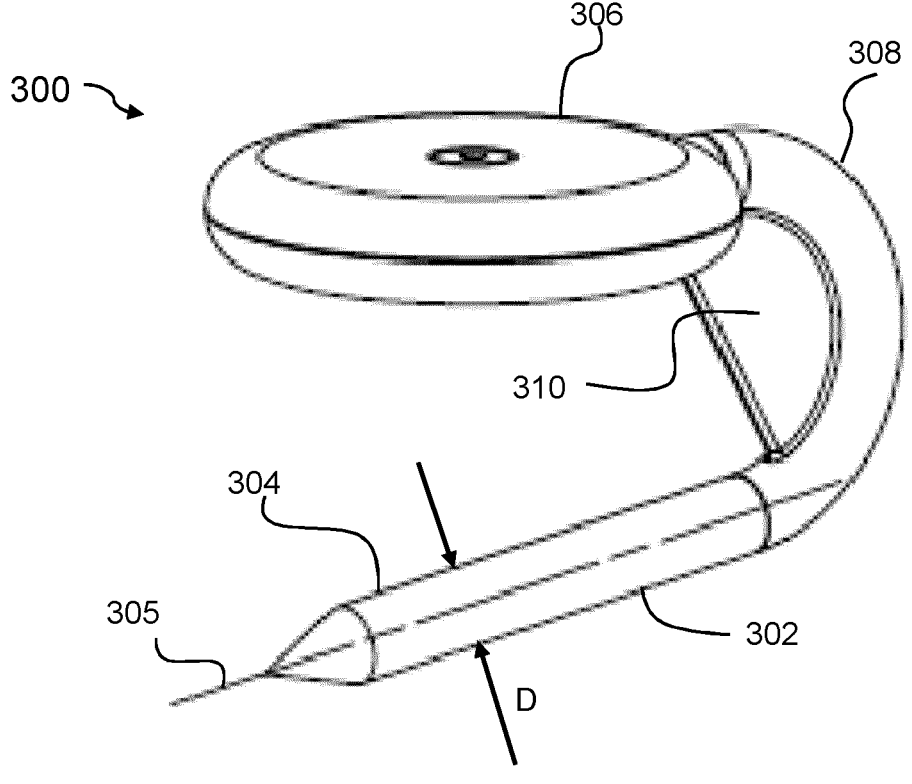
FIG. 3 shows an example of a sensor probe design.

FIG. 3 shows an example of a sensor monitor probe design. The temperature monitor probe 300 comprises a spike 302 for insertion into an object (e.g. food item) for which a core temperature is to be monitored. The spike is elongate with an elongate axis 305. The main section of the spike to be inserted into the object is for example straight, hence with a linear elongate axis, but it could equally be curved. A direction of the spike and of the elongate axis may in that case be considered to be an average of the tangent to the spike curvature along the length of the spike, and hence a general spike direction.

The spike has a temperature monitoring region, such as a region 304 near the distal tip of the spike. A head 306 is at the proximal end of the spike, opposite the tip, and the head 306 is for remaining outside the object.

The circuit described above, having a temperature-dependent characteristic, is formed within the sensor probe 300.

In a preferred example, the capacitor C is formed in the spike 302 at the temperature monitoring region 304, and the sensor inductor coil L is formed in the head 306. In the example shown, the head has a disc shape corresponding to the sensor inductor coil shape. This enables a large sensor coil to be formed as it does not need to be inserted into the object.

The elongate axis 305 of the spike is offset from the plane of the sensor inductor coil in the head 306. Thus, instead of forming a linear probe with a spike at one end and a head at the other, there is a bend 308 between the spike 302 and the head 306. This means the sensor probe takes up less external space once the spike is inserted because the head can be positioned closer to or more preferably against the item. This means in particular that the probe takes up less lateral space around the object, which space may be limited in the case of a food item inside a cooking chamber of an oven, or air fryer etc. It also means a distance can be kept from metal parts, such as the walls of a cooking chamber, by having the head mounted on top of the object.

By having the head against the object, objects can be packed more densely, e.g. food items within a cooking chamber. By having the head above the object (when the head contains the sensor coil), the coupling between the sensor coil and a pick-up coil located above may be improved.

FIG. 3 shows a reinforcing web 310 which also limits the insertion of the spike.

The bend 308 preferably has an angle of between 90 and 180 degrees (inclusive). A 90 degree bend for example allows the spike to be inserted downwardly and the head to remain flat on top of the object. This is suitable for thick items such as a potato. A near 180 degree bend allows the spike to be inserted laterally with the head on top. This is suitable for thinner items, such as a steak.

The bend 308 between the spike and the head makes it easy to insert the spike while maintaining a desired orientation of the spike and/or the head, in particular to enable correct communication with the remote detector unit.

Because the head contains the sensor coil, it is the orientation of the sensor coil that is to be chosen. For example, the detector unit pick-up coil may be mounted in a lid of a cooking device in a horizontal plane (when the cooking device is mounted on a horizontal surface) and the head is then to be oriented horizontally as well.

Figure 4:
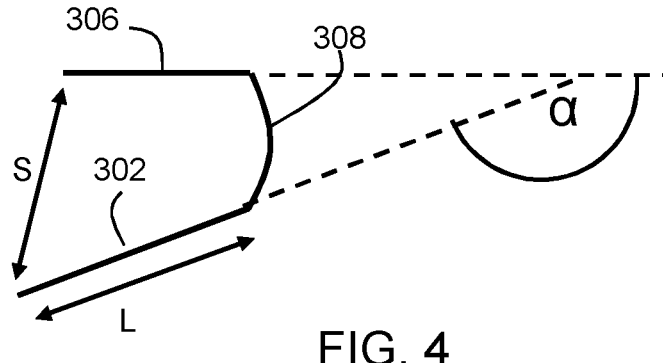
FIG. 4 shows the bend more clearly and shows the bend angle.

FIG. 4 shows the bend angle α. The bend a is for example between 90 and 180 degrees as mentioned above, for example between 135 and 180 degrees, for example between 160 and 180 degrees. The example shown is a near U-bend so that the spike may be inserted laterally (horizontally) and the head sits above the spike also in a horizontal plane.

A diameter D of the spike (shown in FIG. 3) is for example in the range 2 mm to 6 mm. This gives space for any circuit components to be formed internally of the spike, in particular the capacitor and/or other temperature-dependent passive components, while preventing excessive damage to the object.

A minimum spacing S between an end of the spike 302 to be inserted into the object and the head 306 is for example in the range 25 mm to 30 mm. When a U-bend is provided, this spacing for example corresponds to the depth (in the vertical direction) at which the end of the spike is inserted into the object.

A length L of the spike 302 to be inserted in the object is for example the range 25 mm to 60 mm.

Figure 5:
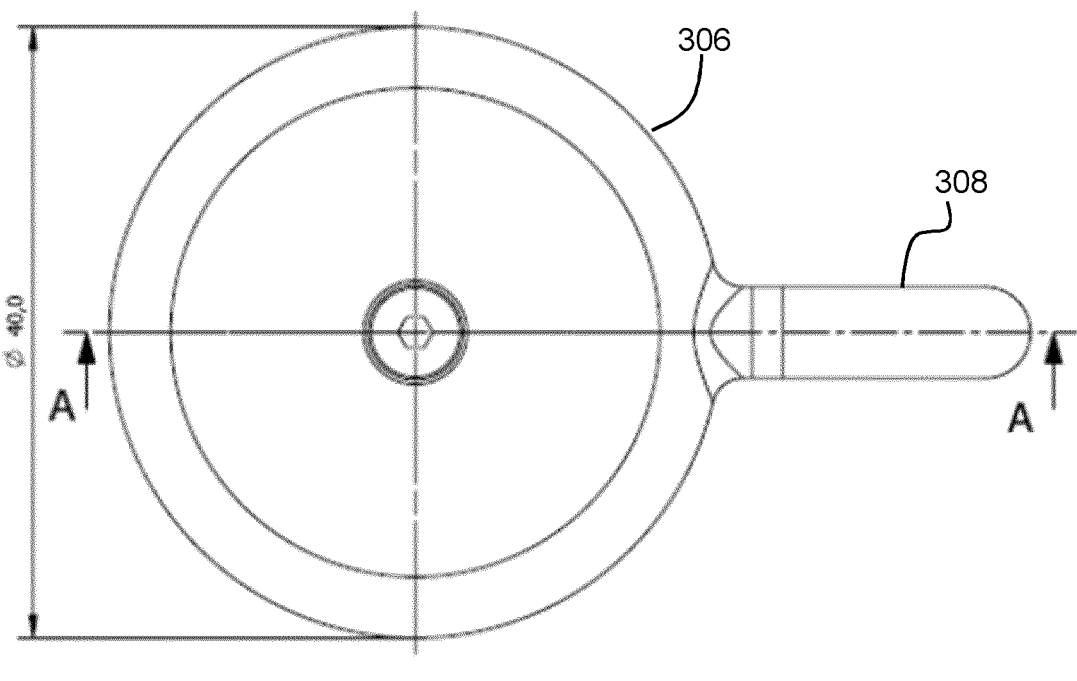
FIGS. 5 and 6 show one detailed example with dimensions.
Figure 6:
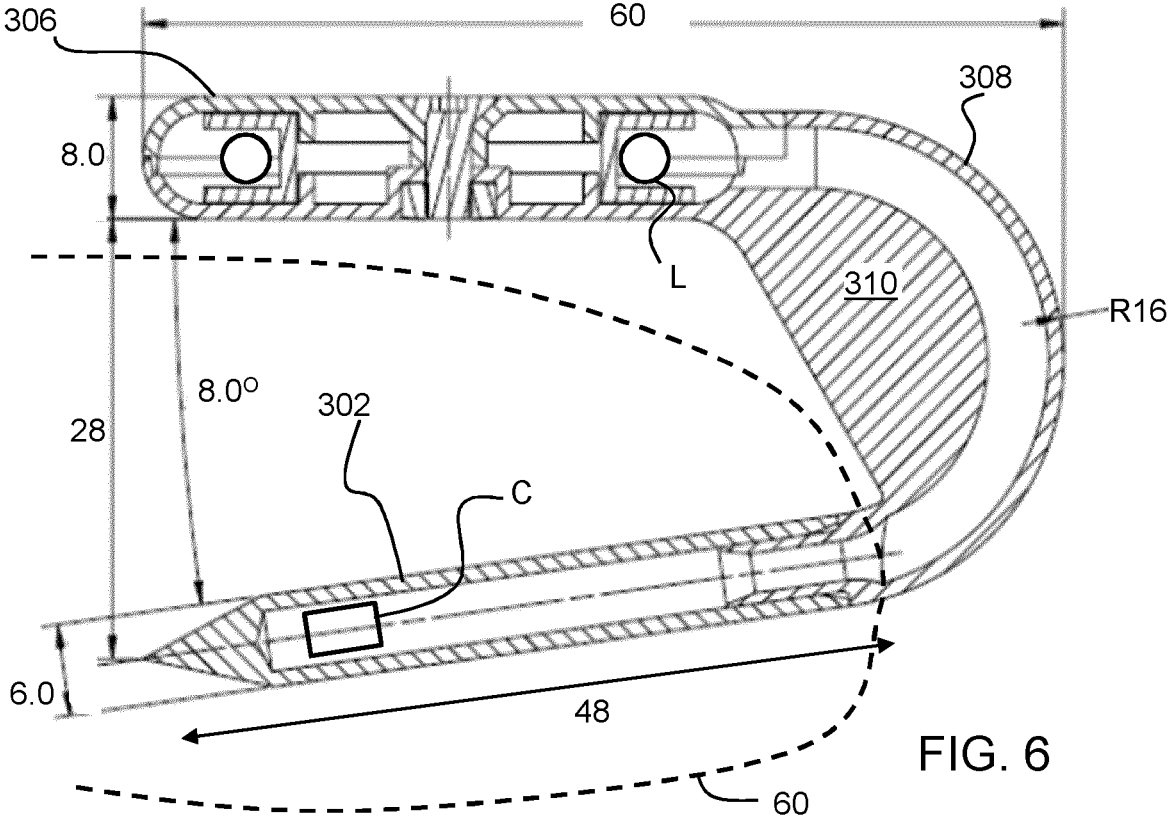

FIGS. 5 and 6 show one detailed example with dimensions. FIG. 5 is a top view of the head 306 and FIG. 6 is a side view in cross section through line A-A of FIG. 5.

In this example, the angle α is 172 degrees (so the head and spike are at 8 degrees). The head has a diameter of 40 mm, and the overall length of the probe is 60 mm. The spike diameter is 6.0 mm and the spike length is 48 mm, The head has a thickness 8.0 mm.

As shown, the capacitor C is at the tip of the spike and the sensor coil L is in the head. The food item is also shown as 60.

Figure 7:
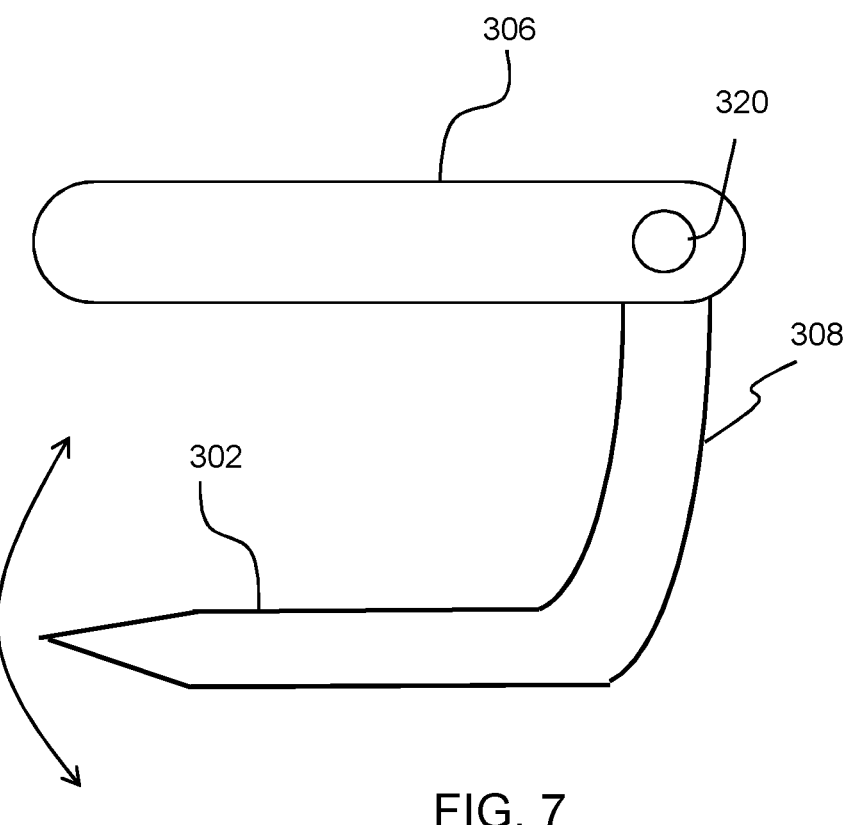
FIG. 7 shows a second example of a sensor probe design.

FIG. 7 shows a second example of a sensor probe design in which the spike 302 (formed integrally with the bend 308) is pivotably mounted to the head 306 at a coupling 320. This allows adjustment of the orientation of the head, and hence the sensor inductor coil, after the spike 302 is inserted into the item.

Figure 8:
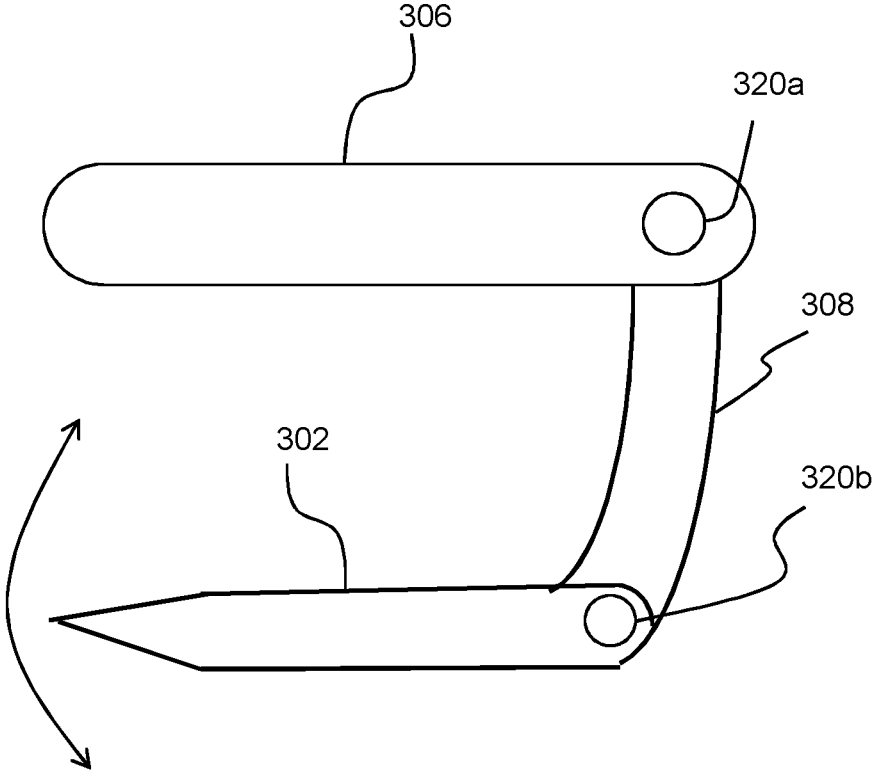
FIG. 8 shows a third example of a sensor probe design.

FIG. 8 shows a third example of a sensor probe design in which there are two pivot couplings 320*a*, 320*b*. The head 306 is pivotably coupled to the bend 308 at a first coupling 320*a* and the bend 308 is pivotably coupled to the spike 302 at a second coupling 320*b*. Thus, the spike has a separate straight section and a bend section pivotably coupled together. This allows adjustment of the orientation of the head as well as adjustment of the orientation of the bend. This means the probe can be shaped to adapt to the outer contour of the item in which the spike is inserted, thus giving a compact fitting to the item.

The overall system 100 may be incorporated into a cooking device or a general kitchen device for temperature sensing. For example, the system may be implemented in an air fryer, a baking oven, a grill, a stirrer, or a steamer, etc. The sensing probe 110 is for insertion into a food item in the cooking device. The invention may be used when the core temperature of a food item is to be used in the operation of a kitchen appliance.

However, the system 100 may be implemented in other fields including medical, wellbeing, process monitoring, etc. in which a passive temperature sensing technique may be advantageous.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A wireless temperature monitor probe, comprising:
   a spike for insertion into an object for which a core temperature is to be monitored, the spike having a temperature monitoring region;
   a head at a proximal end of the spike, wherein the head remains outside the object; and
   a circuit having a temperature-dependent characteristic, wherein the circuit includes a sensor inductor coil for wireless interrogation by an external detector unit to determine temperature at the temperature monitoring region,
   wherein the sensor inductor coil is located in the head, and
   wherein the spike has an elongate axis which is offset from a plane of the sensor inductor coil.

2. The wireless temperature monitor probe of claim 1, further comprising a bend between the elongate axis of the spike and the plane of the sensor inductor coil.

3. The wireless temperature monitor probe of claim 1, wherein a minimum spacing between an end of the spike to be inserted into the object and the head is in a range of 25 mm to 30 mm.

4. The wireless temperature monitor probe of claim 1, wherein a diameter of the spike is in a range of 2 mm to 6 mm.

5. The wireless temperature monitor probe of claim 1, wherein a length of the spike to be inserted in the object is in a range of 25 mm to 60 mm.

6. The wireless temperature monitor probe of claim 1, wherein the circuit further comprises one or more components with temperature-dependent characteristics, and wherein the one or more components and the sensor inductor coil together form a resonant circuit.

7. The wireless temperature monitor probe of claim 6, wherein the one or more components with temperature-dependent characteristics comprises a capacitor with a temperature-dependent capacitance, and/or a thermistor with a temperature-dependent resistance.

8. The wireless temperature monitor probe of claim 7, wherein the one or more components with the temperature-dependent characteristics are in the spike.

9. The wireless temperature monitor probe of claim 1, wherein the spike is pivotably attached to the head.

10. The wireless temperature monitor probe of claim 9, wherein the spike comprises a straight section and a bend section pivotably coupled together.

11. The wireless temperature monitor probe of claim 1 for monitoring the core temperature of a food item during cooking.

12. A wireless temperature monitoring system, comprising:
   the wireless temperature monitor probe of claim 1; and
   a detector unit comprising a pick-up coil for inductive coupling to the sensor inductor coil and a detection circuit.

13. The wireless temperature monitoring system of claim 12, wherein the detection circuit comprises a frequency sweep circuit and a processor for determining a resonant frequency of the circuit of the wireless temperature monitor probe.

14. A cooking appliance comprising the wireless temperature monitoring system of claim 12, the cooking appliance comprising a housing, wherein the pick-up coil of the detector unit is integrated into a part of the housing.

15. The cooking appliance of claim 14, wherein the pick-up coil of the detector unit is integrated into a lid of the housing.

16. The wireless temperature monitor probe of claim 2, wherein the bend is between 90 to 180 degrees.

17. The wireless temperature monitor probe of claim 2, wherein the bend is between 135 to 180 degrees.

18. The wireless temperature monitor probe of claim 2, wherein the bend is between 160 to 180 degrees.

\* \* \* \* \*